United States Patent [19]

Deiner et al.

[11] 4,153,640

[45] May 8, 1979

[54] MODIFIED POLYSILOXANES AND PROCESS OF PREPARING THEM

[75] Inventors: Hans Deiner, Neusäss; Bernhard Sandner; Willy Bernheim, both of Diedorf, all of Fed. Rep. of Germany

[73] Assignee: Ciba-Geigy Corporation, Ardsley, N.Y.

[21] Appl. No.: 774,161

[22] Filed: Mar. 3, 1977

[30] Foreign Application Priority Data

Mar. 4, 1976 [DE] Fed. Rep. of Germany ....... 2608894

[51] Int. Cl.² ..................... C08G 77/12; C08G 77/20; C08L/43/04; C08L 83/04
[52] U.S. Cl. .............................. 260/827; 260/824 R; 428/375; 428/391
[58] Field of Search ........................................ 260/827, 260/824; 428/245. 252, 537, 904, 375, 391

[56] References Cited

U.S. PATENT DOCUMENTS

| | | | |
|---|---|---|---|
| 3,249,586 | 5/1966 | Haluska | 528/11 |
| 3,555,109 | 1/1971 | Getson | 260/825 |
| 3,631,087 | 12/1971 | Lewis et al. | 260/448.2 E |
| 3,694,478 | 9/1972 | Adams et al. | 260/448.2 E |
| 3,776,875 | 12/1973 | Getson | 260/827 |
| 3,932,555 | 1/1976 | Goodrich et al. | 260/827 |
| 4,032,499 | 6/1977 | Kreuzer et al. | 260/827 |

FOREIGN PATENT DOCUMENTS

| | | |
|---|---|---|
| 1228366 | 8/1960 | France. |
| 1367666 | 9/1974 | United Kingdom. |
| 1401086 | 7/1975 | United Kingdom. |

*Primary Examiner*—Allan Lieberman

*Attorney, Agent, or Firm*—Edward Mc. Roberts

[57] ABSTRACT

A process for the production of modified polymers, preferable in organic solvents, by radical-initiated polymerization of (Ia) 70 to 99.9 parts by weight of esters of the formula $$CH_2=C(R)-COOR' \qquad (Ia)$$

in which R is —H or —$CH_3$ and R' are 1 to 18 C-alkyl radicals, at least 50% by weight of the esters of (Ia) being those in which R' are 1 to 4 C-alkyl radicals, (Ib) 0, 1 to 20 parts by weight of ω-hydroxyalkyl esters of acrylic, methacrylic, maleic and/or fumaric esters, the said dicarboxylic acids are possibly etherified on the second carboxylic group with 1 to 12 C-atoms containing alcohols and (Ic) 0 to 10 parts by weight of other unsaturated monomers, the sum of (Ia), (Ib) and (Ic) amounting to 100 parts by weight, in the presence of (II) 5 to 40 parts by weight of terminal blocked alkylhydrogen polysiloxanes, the alkyl radicals containing 1 to 4 carbon atoms, with a viscosity of 20 to 1000 cP at 20° C., the ratio of alkyl radicals to hydrogen atoms thereof being from 13 : 1 to 1 : 1, in which ratios the terminal groups are not included. Organic solvents containing the obtained modified polymers and usual curing agents for alkyl-hydrogen polysiloxanes are useful for treating fibrous material to give water-tight and water-repellent effects.

11 Claims, No Drawings

MODIFIED POLYSILOXANES AND PROCESS OF PREPARING THEM

The present invention relates to the manufacture of modified polymers and to their application.

Polymers which are produced by polymerisation of organic monomers containing an unsaturated C—C double bond, in the presence of free-radical initiators, have come into use on a wide scale because their properties are suited to the particular purpose of application. For example, polymers of acrylic acid and methacrylic acid esters, which optionally contain polymerised therein other monomers capable of copolymerisation are used, inter alia, for dressing leather, for finishing or coating textiles and paper, as disclosed, for example, in "Ullmanns Encyclopadie der technischen Chemie", Verlag Urban & Schwarzenberg, Munich, 14th Volume (1963), page 273.

When such materials are treated with these polymers, a water-tight impregnation is usually obtained, but not a water-repelling impregnation, i.e. the water remains adhering to the treated fibre materials and this, after relatively long wear and tear, leads to a gradual swelling and subsequently to destruction of the polymer and hence to water penetrating into the interior of the fibres or to water penetrating through the fibre material.

It is known to give a water-repelling finish to fibre materials, more especially textiles, with organopolysiloxanes which contain hydrogen atoms bonded to silicon, in the presence of hardening agents. Very good water-repelling effects are obtained in this way, but the water-tightness still frequently leaves much to be desired with continuous wear and tear.

The joint use of the aforementioned polymers with the organopolysiloxanes is rendered difficult by the fact that the two components are frequently not compatible with one another and consequently they usually separate after a relatively short time.

It has also been attempted to graft olefinic monomers on to organopolysiloxanes containing terminal groups which hydrolyse with ambient humidity, by means of initiators which form free radicals. In this case, the grafting is effected either by means of silicon-bonded, activated alkyl and more especially methyl groups, or on to organopolysiloxanes which themselves contain unsaturated radicals, such as vinyl or allyl radicals. However, such graft polymers still have various disadvantages, since they are only capable of a linear condensation via the silicon-bonded, hydrolysis-sensitive terminal groups, and are not capable of crosslinking.

It is desirable to provide products in which the advantageous properties of the polyacrylic or methacrylic acid esters and of the organo-hydrogen polysiloxanes are combined, since the latter are capable of crosslinking.

According to the present invention there is provided a process for the production of modified polymers in which the following components:

(Ia) 70 to 99.9 parts by weight of esters of the general formula

(Ia)

in which

R represents a hydrogen atom or —CH$_3$ group and

R' represents an optionally branched alkyl radical containing 1 to 18 carbon atoms, at least 50% by weight of the compounds of formula (Ia) being those in which R' is optionally branched alkyl radical containing 1 to 4 carbon atoms, (I b) 0.1 to 20 parts by weight of esters of acrylic and/or methacrylic acid containing free hydroxyl groups in the terminal position, and/or monoesters and/or diesters of fumaric and/or maleic acid, which are esterified with one hydroxyl group of a dihydric alcohol in which the alkylene radical may be interrupted by oxygen, the second carboxyl group of fumaric acid and maleic acid either being free or being esterified by an alkyl radical containing 1 to 12 carbon atoms, and (I c) 0 to 10 parts by weight of other monomers capable of copolymerising with (Ia), the sum of the components (Ia), (Ib) and (Ic) amounting to 100 parts by weight, are polymerised at elevated temperature in the presence of free radicals, and in the presence of (II) 5 to 40 parts by weight of terminal-blocked alkylhydrogen polysiloxanes which have a viscosity in the range 20 to 1000 cP at 20° C. and in which the alkyl radicals contain 1 to 4 carbon atoms and the ratio between the silicon-bonded alkyl radicals and the silicon-bonded hydrogen atoms is in the range from 13 : 1 to 1 : 1, in which ratios the terminal groups are not included.

It is now surprising been found that, by the polymerisation of the above mentioned unsaturated compounds using free-radical initiators in the presence of alkylhydrogen polysiloxanes, industrially valuable modified polymers are obtained in which the combined advantages of the polymers and of the alkyl-hydrogen polysiloxanes are present. This result is surprising, particularly because it actually had been assumed that alkylhydrogen polysiloxanes, under the action of the oxidising agents usually employed as free-radical initiators would be substantially crosslinked and thus become unsuitable for use, see W. Noll, "Chemie and Technologie der Silikone", Verlag Chemie, Weinheim/Bergstrasse, 2nd Edition (1968), page 509, 2nd paragraph. This however, is not the case, because in the reaction products which are obtained, the number of the silicon-bonded hydrogen atoms only decreases to a small degree, so that in the modified polymers, the crosslinking capacity of the alkyl-hydrogen polysiloxanes is maintained. The alkyl-hydrogen polysiloxanes actually participate in the reaction which is shown from the fact that no phase separation occurs, such as is frequently the case with mixtures of polymers with organo-hydrogen polysiloxanes.

Unless otherwise expressly indicated, the term "modified polymers" used herein means the reaction products as obtained from the process without further processing.

The modified polymers obtained in accordance with the invention are suitable for the treatment of fibre materials of all types. As compared with the non-modified polymers, they have the advantage of an improved water-repelling effect. At the same time, the feel or "handle" of the treated fibre materials is improved. Suitable fibre material include products of natural and man made-fibres, such as paper, leather and more particularly textiles. The modified polymers may be applied to fibre materials of all types, more especially textile material, together with hardening agents which are usual for the curing of alkyl-hydrogen polysiloxanes.

Examples of compounds of component (Ia) for use in the invention are acrylic acid and methacrylic acid esters which contain 1 to 18 carbon atoms in the optionally branched alkyl radical. Specific examples of such esters are the methyl, ethyl, butyl, and the n-octyl esters of acrylic and methacrylic acids, and the esters of 2-ethyl hexanol, n-dodecanol and n-octadecanol. Of the monomers of component (Ia) at least 50% by weight and more particularly 70% by weight of acrylic or methacrylic acid esters of alcohols with 1 to 4 carbon atoms are used. Generally acrylic acid esters are preferred.

During the polymerisation, it is expedient to introduce esters which contain free hydroxyl groups in the end position in addition to the esters of the component (Ia), since this leads to additional advantages during use. These esters, which are designated as component (Ib), contain free hydroxyl groups in the terminal position and are derived from acrylic, methacrylic, maleic and/or fumaric acids, which are esterified with one hydroxyl group of dihydric alcohols, in which the alkylene radical may optionally be interrupted by oxygen. Suitable esters include those of the formulae

    (Ib')

and/or   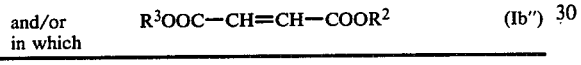   (Ib")
in which

R is as defined above $R^2$ represents $-(CH_2)_n-OH$ or $-(CH_2)_m-O-(CH_2)_m-OH$ and $R^3$ represents a hydrogen atom or an alkyl radical containing 1 to 12 carbon atoms, n is 2, 3 or 4 and m is 2 or 3.

Examples of compounds of the formula (Ib') are the 2-hydroxethyl-, 3-hydroxypropyl- and the 4-hydroxybutyl-acrylates or methacrylates. Moreover, acrylic acid or methacrylic acid esterified on one side with diethylene glycol or dipropylene glycol is also suitable.

Examples of compounds of the formula (Ib"), in which $R^3$ is a hydrogen atom are the esters in which the acids are esterified with one hydroxyl group of monoethylene or diethylene glycol, propylene or butylene glycol or with one hydroxyl group of dipropylene glycol.

With regard to the diesters of the formula (Ib") in which $R^3$ is an alkyl radical containing 1 to 12 carbon atoms, suitable radicals containing the free hydroxyl group are the same as those in the mono-esters. The esters containing terminally free hydroxyl groups (component Ib) are introduced in such quantities that their proportion, related to the sum of the components (Ia), (Ib) and (Ic) amounts to 0.1 to 20, preferably 0.1 to 10, and more especially 2 to 8% by weight. The most advantageous results are produced when they are employed in the latter range.

It is also possible to include in the reaction system small amounts of unsaturated compounds (indicated by (Ic) which are capable of copolymerisation with the compounds of the formula (Ia). Examples of such compounds include styrene, vinyl toluene and acrylic acid. The quantity of these compounds, related to the sum of the components (Ia), (Ib) and (Ic), should not exceed 10% by weight and preferably does not exceed 5% by weight.

All the polymerisable compounds used in the process of the invention may be used in a normal commercial form.

The polymerisation is carried out in the presence of end-blocked alkyl-hydrogen polysiloxanes. Examples of such polysiloxanes include ethyl-, propyl- and butyl-hydrogen polysiloxanes, and preferably methyl- hydrogen polysiloxanes. The preferred compounds are those alkyl-hydrogen polysiloxanes in which the ratio between alkyl radical and hydrogen atom, disregarding the terminal groups, such as the trimethylsilyl groups, is about 1:1.

Besides, however, alkyl-hydrogen polysiloxanes are also suitable in which the alkyl radical hydrogen atom ratio is greater than 1:1, namely, up to about 13:1. Nevertheless, products which have been produced with the use of alkyl-hydrogen polysiloxanes with which the alkyl radical : hydrogen ratio is larger than 5:1, are less suitable for use, since the advantages of the products which are produced and used in accordance with the invention are mainly dependent on the silicon-bonded hydrogen atoms which are present in the modified polymers. The alkyl-hydrogen polysiloxanes do not contain any hydrolysis-sensitive groups or hydroxyl groups, but are blocked at the ends, for example, by trimethylsilyl groups.

The alkyl-hydrogen polysiloxanes which can be used in the process of the invention have a viscosity from 20 to 1000 cP at 20° C., and the methyl-hydrogen polysiloxanes which are particularly preferred have a viscosity from 20 to 350 cP at 20° C.

The ratio between the polymerisable compounds (sum of the components (Ia), (Ib) and (Ic) which are used for the reaction and the alkyl-hydrogen polysiloxanes (component II) is 100 parts by weight to from 5 to 40 parts by weight. Higher proportions of alkyl-hydrogen polysiloxanes do not introduce any additional advantages. Since products which are very suitable for use are obtained with a ratio between component I and component II at the time of polymerisation of 100 to from 5 to 20 parts by weight, this ratio is particularly preferred on economic grounds.

The polymerisation is started by the presence of usual free radical initiators. Suitable initiators include organic peroxides, such as, dialkyl peroxides, e.g. diethyl peroxide, diisopropyl peroxide, di-(tert.-butyl)peroxide; dilauryl peroxide; alkyl-hydrogen peroxides e.g. tert.-butyl hydroperoxide; diacyl peroxides, e.g. diacetyl peroxide, dilauroyl peroxide, dibenzoyl peroxide, bis-(2,4-dichloro-benzoyl)peroxide; ketone peroxides, e.g. methyl ethyl ketone peroxide and cyclohexanone peroxide. Azo compounds, e.g. azo(diisobutyronitrile), are also suitable. The preferred initiators are those which are able, in a temperature range from 50 to 120° C., optionally in the presence of a suitable solvent, to form sufficient free radicals for triggering polymerisation. Bis-(2,4-dichlorobenzoyl) peroxide, dibenzoyl peroxide, tert.-butyl peroctoate dilauroyl peroxide and azodiisobutyronitrile are particularly preferred.

The process for the production of the modified polymers in accordance with the invention is preferably carried out in an organic solvent. The solvent serves three purposes; firstly, it ensures that the reaction proceeds under controllable conditions, i.e. avoiding any overheating with the initiation of the exothermic polymersation; secondly, it influences the decomposition of the initiators into radicals; thirdly, the presence of organic solvent allows the reaction medium to be satisfactorily stirred, since the viscosity of the reaction mixture increases during the reaction.

Water-soluble organic solvents, organic solvents having limited water solubility, e.g. dioxane, ethyl acetate and methyl ethyl ketone, and particularly water-insoluble organic solvents e.g. optionally substituted hydrocarbons, such as benzine, octane, cyclohexane, benzene, toluene, xylene and chlorobenzene are all suitable for use in the invention. Esters and ketones, for example, butyl acetate, methyl butyrate, methyl isobutyl ketone are also suitable. Toluene has proved to be an especially suitable solvent. The amount of the solvent is generally chosen that the concentration of the modified polymer (solid substance) is in the range from 30 to 60% by weight.

The polymerisation reaction is carried out by introducing a portion of the compounds capable of polymerisation (component (Ia) and component (Ib) and possibly component (Ic)), the alkyl-hydrogen polysiloxane (component II) and optionally the solvent into a suitable reaction vessel, adding a portion of the initiator and heating.

It is desirable for the reaction vessel to be flushed with nitrogen before the components are introduced. After the initiation of the polymerisation, which can be recognised by the increase in viscosity and the rise in temperature of the reaction mixture, the remaining quantity of monomers and optionally more solvent are allowed to run in slowly. Finally, it is preferable to add more initiator and a post-reaction is allowed to take place at elevated temperature. In the presence of a solvent, the operating procedure is usually for the reaction mixture to boil under reflux during the reaction and post-reaction. The entire reaction is completed after approximately 2 to 3 hours.

After cooling, viscous, clear or cloudy solutions or stable dispersions are obtained, depending on the type and quantity of the solvent which is used and the type and quantity of the monomers which are employed. The splitting off of hydrogen from the alkyl-hydrogen polysiloxane during the polymerisation is exceedingly small. It was found that still about 85 to 95% of the silicon-bonded hydrogen from the introduced alkyl-hydrogen polysiloxane are still present in the final product.

It is expedient for the quantity of solvent to be so chosen that the modified polymers as obtained show a content of dry substance of about 30 to 60% by weight. As regards the use of the modified polymers which are produced according to the invention, and especially for coating purposes, it is desirable to control the polymerisation so that the polymers, after completion of polymerisation, show a viscosity from 5000 to 35,000 cP at 20° C. in the above concentration range. This control can for example be achieved by the solvent being only partially supplied during the polymerisation. The nature of the solvent which is used and the nature and quantity of the employed initiator is also of considerable importance. Furthermore, the viscosity, even after polymerisation has ended, can be regulated by partially distilling off solvent or adding more solvent. The nature of the introduced alkyl-hydrogen polysiloxane, i.e. whether alkyl-hydrogen polysiloxanes with an alkyl radical : hydrogen ratio of 1:1 or up to 13:1 is used, surprisingly has only a relatively small influence on the viscosity of the final products.

If desired, the small amounts of unreacted monomers and the solvent can be removed by distillation under reduced pressure. However, since the modified polymers which are obtained are used in the form of solutions in organic solvents, such a working-up procedure is usually unnecessary.

The yields from the reaction are very high. For example, in a test in which no solvent was used the non-volatile reaction product was obtained with a yield of 98% of the theorectical after distilling off the volatile consituents under vacuum.

The modified polymers which are produced by the process of the invention, together with hardening agents which are generally usual for the curing of alkyl-hydrogen polysiloxanes, may be used for the treatment of fibre material, more especially textile material. As compared with the unmodified polymers, the modified polymers offer the advantage of an improved water-repelling effect. This effect is further improved if, in connection with the preparation by the process of the invention, there are concurrently used as unsaturated esters those which contain free hydroxyl groups (components (Ib') and (Ib'')). In addition the typical "silicone handle" of the treated textiles is mainly retained. As compared with the alkyl-hydrogen polysiloxanes, the modified polymers which are produced by the process of the invention have the advantage of the improved water-tightness. In addition, a finishing with a filling action is imparted to the fibre materials which are treated. Also with the use of the modified polymers produced in accordance with the invention and as compared with the mixtures of unmodified polymers and alkyl-hydrogen polysiloxanes, there is provided the advantage of an improved water-repulsion and water-tightness and the permanence thereof, apart from the improved stability of the product.

It is generally preferred to use the modified polymers, which have been prepared with the use of acrylic acid esters (components (Ia) and (Ib)), because of their more favourable properties at their application, since the modified polymers, produced with the use of methacrylic acid esters, frequently provide an undesirably hard feel or handle on the fibre material.

The following hardening agents are for example suitable for curing the modified polymers: organic metal compounds, e.g. salts of aluminium, zirconium, titanium and zinc, with organic acids, aluminium, zirconium and titanium alcoholates, organic tin compounds, especially diorganotin carboxylates, such as dioctyl-tin diacetate, dibutyl-tin dilaurate and dibutyl-tin maleate. Aminoalcohols and amines particularly alkylene polyamines are also useful. The amines are preferably used in the form of their salts with organic or inorganic acids.

The modified polymers prepared in accordance with the invention which have been produced with the use of esters containing free hydroxyl groups (components Ib)), can also be cross-linked with compounds which contain at least 2 isocyanate groups.

For treatment of the fibre material, more particularly textiles, the modified polymers, optionally diluted with additional solvent, are used together with the hardening agents in the form of solutions in organic solvents. Suitable solvents for this purpose include aliphatic and aromatic hydrocarbons, e.g. benzines, toluene, benzene and xylene, chlorinated aliphatic and aromatic hydrocarbons, e.g. trichloroehtylene and chlorobenzene, and esters e.g. butyl acetate. Trichloroethylene has proved to be particularly suitable. The solutions may be applied to the fibre material by immersion and squeezing (padding), kissing, spraying and especially by the usual coating methods e.g. by doctor-knives. The concentration of the modified polymers in the solvents is adjusted to conform to the method of application. When using the padding method, the finishing bath solutions generally contain 1 to 10% by weight of modified polymer, calculated as solid substance. On the other hand, when using coating methods such as a doctor-knife-method the modified polymer is used in a concentration of 15 to 60% by weight (solids). The quantity of the hardening agents used is normally 0.5 to 10% by weight and advantageously 1 to 5% by weight, based on the modified polymer (solid).

In addition, the treatment bath solutions can also contain other substances, for example finishing agents, etc., which are usual for the treatment of textiles from organic solvents.

In the coating operation, it is also possible to use white and/or coloured pigments, such as titanium dioxide, permanent white, carbon black or conventional inorganic or organic pigment dyestuffs, or also fillers, such as colloidal silicon dioxide, kaolin or talcum.

After the treatment with the solutions of the treating substances, the solvent is evaporated by heating up to about 120° C. and then optionally further heating takes place for a short time at 120° C. to 190° C. for curing purposes.

The modified polymers produced in accordance with the invention serve for the treatment of fibre materials of all types, more particularly textile material of all types, whether in the form of woven, non-woven or knitted fabrics. These can be produced from natural fibres, e.g. cellulose fibres or keratin fibres, and also from man-made fibres, e.g. polyacrylonitrile, polyamide, polyvinyl alcohol or polyester. Textile materials which consist of mixtures of natural and man-made fibres may also be treated. It is to be pointed out that light woven fabrics, such as taffeta or light poplin materials, can also be given a finish or water-tight coating by the process of the invention. This is particularly important in respect of rainproof clothing, such as anoraks and the like.

The invention will now be illustrated by the following Examples.

EXAMPLE 1

After the apparatus was thoroughly flushed with nitrogen, 100 ml of a mixture of 218.3 g of methyl acrylate, 109.1 g of ethyl acrylate, 29.1 g of 2-ethylhexyl acrylate, 7.3 g of 2-hydroxyethyl acrylate, 36.4 g of methylhydrogen polysiloxane, terminally blocked by trimethylsilyl (ratio between the methyl groups and the hydrogen which can be split off of 1:1, viscosity 30 cP at 20° C.), and 45 g of toluene, in which are dissolved 0.19 g of benzoyl peroxide, were introduced into a 2-liter, four-necked spherical flask, equipped with an efficient anchor type stirrer mechanism, a reflux condenser, thermometer and two supply vessels, and heated to 80° to 82° C. The residual monomers were introduced into the supply vessel 1. The supply vessel II was charged with 455 g of toluene.

After the initiation of the polymerisation, which was recognised from the commencement of reflux and an increase in viscosity of the contents of the flask, the temperature rose to 90° to 92° C. At this temperature and with constant reflux, the residual monomer mixture was added over a period of 20 to 30 minutes. The viscosity was prevented from rising to beyond the level at which stirring could take place by addition of toluene. After the supply of monomer was complete 0.56 g of benzoyl peroxide, dissolved in 100 g of toluene, were slowly added and the residual amount of toluene added dropwise at reflux temperature. The batch was stirred for another 1 to 1½ hours under gentle reflux, until the temperature has reached approximately 108° C.

After cooling, about 1 kg of a cloudy solution with approximately 40% by weight of solid substance was obtained, the solution having a viscosity of about 25,000 cP (measured with the Brookfield Viscosimeter, type RVF, Spindle C, 10 r.p.m.). The crosslinking capacity of the modified polymer as obtained was almost completely maintained, because the product obtained still contained about 90% of that silicon-bonded hydrogen of the introduced methyl-hydrogen polysiloxane which could be split off.

EXAMPLE 2

Using the procedure described in Example 1, 36.4 g of methyl-hydrogen polysiloxane (particulars, see Example 1), 72.8 g of methyl acrylate, 218.3 g of butyl acrylate, 67.3 g of 2-ethylhexyl acrylate and 7.3 g of 2-hydroxyethyl acrylate were reacted, using altogether 600 g of toluene. The initiator is 1.0 g of bis-(2,4-dichlorobenzoyl)-peroxide, 0.25 g thereof being introduced at the start and 0.75 g being introduced for the post reaction.

After cooling, about 1 kg of a cloudy solution was obtained, the solution having about 40% by weight of solid substance, and a viscosity of about 14800 cP (measured as in Example 1). The final product as obtained contained about 91% of the silicon-bonded hydrogen of the introduced methyl-hydrogen polysiloxane, which hydrogen could be split off.

EXAMPLE 3

The procedure of Example 1 was repeated, but using, as methyl-hydrogen polysiloxane, 36.4 g of methyl-hydrogen polysiloxane, in which the ratio between the methyl groups and the silicon-bonded hydrogen atoms was 5:1 (viscosity 200 cP at 20° C.).

Altogether 0.8 g of azodiisobutyrodinitrile are used as initiator.

About 1 kg of a cloudy solution (solid content about 40% by weight) with a viscosity of 19600 cP was obtained.

EXAMPLE 4

Example 3 was repeated, but replacing the methyl-hydrogen polysiloxane used therein by one in which the ratio between the methyl radicals and the hydrogen which can be split off was 13:1 (viscosity 230 cP at 20° C.). 36.4 g of this siloxane were likewise introduced. The product as obtained (solid content 40% by weight) exhibited a viscosity of 18300 cP.

EXAMPLE 5

48 g of methyl-hydrogen polysiloxane (specification as in Example 1), 72 g of methyl acrylate, 36 g of ethyl acrylate, 9.6 g of 2-ethylhexyl acrylate and 2.4 g of 2-hydroxyethyl acrylate were carefully heated to 90° to 100° C. in a 1-liter, three necked spherical flask equipped with a stirrer mechanism, reflux condenser and thermometer after the addition of 2 g of benzoyl peroxide. After the reaction had been started, the temperature rose quickly to 180° to 200° C. and a viscous product having milky cloudiness formed. After stirring for 2 hours at 160° C., residual monomers were extracted under reduced pressure. After cooling, 165 g of a whitish cloudy product were obtained, with a viscosity of about 18000 cP. The viscosity of the product dissolved in toluene (content of solid substance 40% by weight) amounts to 8500 cP.

The amount of hydrogen capable of being split off from the final product was about 95% of the introduced methyl-hydrogen polysiloxane.

EXAMPLE 6

After flushing with nitrogen a 2-liter, four-necked spherical flask, with the equipment as indicated in Example 1, 100 g of a mixture of 123.5 g of methyl acrylate, 33.3 g of ethyl methacrylate, 136.3 g of 2-ethylhexyl acrylate and 26.9 g of 3-hydroxypropyl acrylate were introduced and 77.4 g of methyl-hydrogen polysiloxane (specification, see Example 1) and 0.22 g of benzoyl peroxide, dissolved in 60 ml of n-butyl acetate added and the mixture is heated while stirring to about 75° to 80° C. After the initiation of the reaction, the further procedure in accordance with Example 1 was adopted, 0.64 g of benzoyl peroxide being added for the post-reaction. Altogether 600 g of n-butyl acetate were introduced, so that the result was an approximately 40% by weight solution.

The cloudy product did not separate out, even after standing for a relatively long time.

EXAMPLE 7

Using the procedure of Example 6, the following components were polymerised: 112.0 g of methyl acrylate, 78.7 g of ethyl acrylate, 110.4 g of 2-ethylhexyl acrylate, 9.0 g of styrene and 10.2 g of stearyl methyacrylate. The polymerisation was carried out in the presence of 80.0 g of methyl-hydrogen polysiloxane (specification as in Example 1). Altogether 600 g of toluene were used as solvent and 1.2 g of tert.-butyl peroctoate were used as catalyst, of which 0.3 g were added at the start and the remainder for the post-reaction, in each case dissolved in toluene.

EXAMPLE 8

80.0 g of methyl-hydrogen polysiloxane (particulars see Example 1), 100 ml of a monomer mixture of 112.0 g of methyl acrylate, 78.4 g of ethyl acrylate, 110.4 g of 2-ethylhexyl acrylate, 10.2 g of lauryl acrylate and 9.0 g of maleic acid butyl hydroxyethyl ester, together with 50 g of trimethyl benzene were introduced into a 2-liter, four-necked spherical flask (as in Example 1). After adding 0.8 g of benzoyl peroxide, the mixture was carefully heated to 90° to 100° C. After initiation of the reaction, the temperature rose to 140° to 150° C. The remainder of the monomer mixture was allowed to run in, together with 420 g of trimethyl benzene, over a period of 30 minutes. For the post-reaction, a further 1.2 g of benzoyl peroxide, dissolved in 30 g of trimethyl benzene, were added and the reaction mixture was kept for about 2 more hours under gentle reflux.

After cooling, about 800 g of a cloudy solution were obtained with which no depositions are found, even after standing for 3 months.

EXAMPLE 9

Adopting the procedure of Example 1, 72.0 g of methyl acrylate, 36.0 g of ethyl acrylate, 9.6 g of 2-ethylhexyl acrylate, 1.0 g of maleic acid monohydroxyethyl ester and 2.4 g of 2-hydroxyethyl acrylate were reacted in the presence of 48.0 g of methyl-hydrogen polysiloxane (particulars see Example 1) using altogether 0.3 g of dibenzoyl peroxide. Altogether 120 g of toluene were used as solvent.

After cooling, a viscous, slightly cloudy solution was obtained, which had a solid content of 58.5% by weight.

| Examples of Application | Example A |
|---|---|
| used for coating polyamide taffeta (about 70 g/m²) and polyester taffeta (about 80 g/m²) The following coating compositions were used: | |
| Composition I | |
| 1000 g of modified polymer (40% by weight solid substance) according to Example 1 20 g of dibutyl-tin dilaurate | |
| Composition II | |
| 1000 g of a copolymer in accordance with Example 1, but omitting the alkyl-hydrogen polysiloxane, adjusted to a solid content of 40% by weight (viscosity about 25000 cP) | |
| Composition III | |
| 963.6 g of copolymer, as under II 36.4 of methyl-hydrogen polysiloxane (for particulars, see Example 1) 20 g of dibutyl-tin dilaurate. | |

The coating was effected by means of air doctor-knives (doctor-knife between rollers) with a speed of 10 m per minute and the coated woven fabric was then continuously conducted into a heating duct (residence time 2 minutes) and dried and condensed at 145° C. With the polyamide taffeta, the coating was about 22 g/m² and with the polyester taffeta, it was about 24 g/m². A part of the finished textiles was washed 5 times in the usual manner at 40° C. in the machine, while another part was dry cleaned (DC) 3 times in the presence of 2 g/l of a conventional cleaning intensifier and 2 g/l of water.

The results after conditioning under normal climatic conditions are set out in the following Table.

| Polyamide Taffeta | | | | | | |
|---|---|---|---|---|---|---|
| | Spray test according to AATCC 22-1967 | | | water tightness according to DIN 53886 | | |
| Coating Composition | Original | 5 × 40° C. washing | 3 × DC | Original | 5 × 40° washing | 3 × DC |
| I | 100 | 90 | 80 | 820 | 150 | 150 |
| II | 80 | 70 | 0 | 390 | 120 | 0 |
| III | 100 | 70 | 50 | 500 | 120 | 30 |
| untreated | 0 | — | — | 0 HIgher than | — | — |
| Polyester Taffeta | | | | | | |
| I | 100 | 90 | 90 | 1000 | 250 | 200 |
| II | 90 | 70 | 0 | 420 | 170 | 0 |
| III | 100 | 70 | 50 | 520 | 190 | 50 |
| untreated | 0 | — | — | 0 | — | — |

The coating composition III has a relatively short period of use, which usually is not sufficient for practical requirements.

EXAMPLE B

The procedure of Example A was repeated, using the following coating composition:
1000 g of copolymer, according to Example 3
20 g of a 20% solution of diethylene triamine in propanol
5 g of glacial acetic acid.

The results correspond substantially to those of Example A, composition I.

EXAMPLE C

A polyacrylonitrile-cotton mixed woven fabric 60/40 (280 g/m², precleaned in trichlorethylene for removing preparations) was padded with the following finishing bath solution:
30 g of copolymer, according to Example 7
0.8 g of zinc octoate
969 g of trichlorethylene The solution absorption was about 170%. The woven fabric was dried at 120° C. until the residual solvent had evaporated and then levelled with gentle steaming. In this way, a fabric was obtained which had hydrophobic properties and a full, wool-like soft handle, improved dimensional stability and good stretching properties. Furthermore, the crease resistance was improved as compared with the untreated fabric.

EXAMPLE D

The procedure of Example C was repeated with the following finishing solution:
30 g of copolymer, according to Example 6,
0.8 g of zinc octoate
969 g of trichlorethylene The results correspond substantially to those of Example C, however, the hydrophobic properties are more strongly pronounced.

What we claim is:

1. A process for the production of a modified polymer, comprising the step of reacting, at elevated temperature in the presence of a radical initiator, the following components:

(Ia) 70 to 99.9 parts by weight of an ester of the formula

in which
    R represents a hydrogen atom or a —CH₃ group and R' represents a straight or branched chain alkyl radical containing 1 to 18 carbon atoms, or mixtures thereof, wherein at least 50% by weight of said esters are those in which R' is an alkyl radical containing 1 to 4 carbon atoms, (Ib) 0.1 to 20 parts by weight of an organic acid ester of the formula

in which
    R represents a hydrogen atom or a —CH₃ group and R² represents

—(CH₂)$_n$—OH or —(CH₂)$_m$—O—(CH₂)$_m$—OH, in which
n is 2, 3 or 4 and
m is 2 or 3
or of the formula

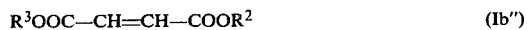

in which
R³ represents a hydrogen atom or an alkyl radical containing 1 to 12 carbon atoms, and
R² is as defined above,
or mixtures of organic acid esters of formulas (Ib') and (Ib''), (Ic) 0 to 10 parts by weight of other monomers capable of copolymerising with components of formula (Ia), the sum of the components (Ia), (Ib) and (Ic) amounting to 100 parts by weight, in the presence of (II) 5 to 40 parts by weight of a terminal-blocked alkyl-hydrogen polysiloxane which has a viscosity in the range from 20 to 1000 cP at 20° C., and in which the alkyl radicals contain 1 to 4 carbon atoms, and the ratio between the silicon-bonded alkyl radicals and the silicon-bonded hydrogen atoms is in the range from 13:1 to 1:1, in which ratios the terminal groups are not included.

2. A process according to claim 1 which comprises polymerising
   80 to 99.9 parts by weight of said component (Ia),
   0.1 to 10 parts by weight of said component (Ib),
   0 to 10 parts by weight of said component (Ic), the sum of the components (Ia), (Ib) and (Ic) amounting to 100 parts by weight, in the presence of 5 to 40 parts by weight of said alkyl-hydrogen polysiloxane II).

3. A process according to claim 1, which comprises polymerising 87 to 98 parts by weight of said component (Ia), 2 to 8 parts by weight of said component (Ib) and 0 to 5 parts by weight of said component (Ic), the sum of the components (Ia), (Ib) and (Ic) amounting to 100 parts by weight, in the presence of 5 to 40 parts by weight of said alkyl-hydrogen polysiloxane II).

4. A process according to claim 1 which comprises polymerising 70 to 99.9 parts by weight of said component (Ia),
   0.1 to 20 parts by weight of said component (Ib) and
   0 to 10 parts by weight of said component (Ic), the sum of the components (Ia), (Ib) and (Ic) amounting to 100 parts by weight, in the presence of 5 to 40 parts by weight of said terminal-blocked alkyl-hydrogen polysiloxane (II), having a viscosity in the range from 20 to 1000 cP, the alkyl radicals being methyl radicals and the ratio between the silicon bonded methyl radicals and the silicon bonded hydrogen atoms being in the range from 13:1 to 1:1, in which ratios the terminal groups are not included.

5. A process according to claim 1 which comprises polymerising 70 to 99.9 parts by weight of said component (Ia),
   0.1 to 20 parts by weight of said component (Ib) and
   0 to 10 parts by weight of said component (Ic), the sum of the components (Ia), (Ib) and (Ic) amounting to 100 parts by weight, in the presence of 5 to 40 parts by weight of said terminal-blocked alkyl-hydrogen polysiloxane (II), having a viscosity in the range from 20 to 350 cP, the alkyl radicals being methyl radicals and the ratio between silicon bonded methyl radicals and the silicon bonded hydrogen atoms being in the range from 5:1 to 1:1, in which ratios the terminal groups are not included.

6. A process according to claim 1 which comprises polymerising 70 to 99.9 parts by weight of said component (Ia), 0.1 to 20 parts by weight of said component (Ib) and 0 to 10 parts by weight of said component (Ic), the sum of the components (Ia), (Ib) and (Ic) amounting to 100 parts by weight, in the presence of said alkyl-hydrogen polysiloxane (II), said component (II) being present in an amount of 5 to 20 parts by weight.

7. A process according to claim 1 which comprises polymerising 70 to 99.9 parts by weight of said component (Ia), 0.1 to 20 parts by weight of said component (Ib) and 0 to 10 parts by weight of said component (Ic), the sum of the components (Ia), (Ib) and (Ic) amounting to 100 parts by weight, in the presence of 5 to 40 parts by weight of said terminal-blocked alkyl-hydrogen polysiloxane (II), the polymerisation being effected in an organic solvent.

8. A process according to claim 1 which comprises polymerising 70 to 99.9 parts by weight of said component (Ia), 0.1 to 20 parts by weight of said component (Ib) and 0 to 10 parts by weight of said component (Ic), the sum of the components (Ia), (Ib) and (Ic) amounting to 100 parts by weight, in the presence of 5 to 40 parts by weight of said terminal-blocked alkyl-hydrogen polysiloxane (II), the polymerisation being effected in a water-insoluble organic solvent.

9. A process according to claim 1 which comprises polymerising 87 to 98 parts by weight of said component (Ia), 2 to 8 parts by weight of said component (Ib) and 0 to 5 parts by weight of said component (Ic), the sum of the components (Ia), (Ib) and (Ic) amounting to 100 parts by weight, in the presence of 5 to 20 parts by weight of said terminal-blocked alkyl-hydrogen polysiloxane (II) having a viscosity in the range from 20 to 350 cP, the alkyl radicals being methyl radicals and the ratio between silicon bonded methyl radicals and the silicon bonded hydrogen atoms being in the range from 5:1 to 1:1, in which ratios the terminal groups are not included.

10. A process according to claim 1 which comprises polymerising 87 to 98 parts by weight of said component (Ia), 2 to 8 parts by weight of said component (Ib) and 0 to 5 parts by weight of said component (Ic), the sum of the components (Ia), (Ib) and (Ic) amounting to 100 parts by weight, in the presence of 5 to 20 parts by weight of said terminal-blocked alkyl-hydrogen polysiloxane (II) having a viscosity in the range from 20 to 350 cP, the alkyl radicals being methyl radicals and the ratio between silicon bonded methyl radicals and the silicon bonded hydrogen atoms being in the range from 5:1 to 1:1, in which ratios the terminal groups are not included, the polymerisation being effected in the presence of a water-insoluble organic solvent.

11. A polymer obtained by polymerising, at elevated temperature in the presence of a radical initiator, the following components:

(Ia) 70 to 99.9 parts by weight of an ester of the general formula $$CH_2=C-COOR' \quad \quad (Ia)$$
$$\phantom{CH_2=}|$$
$$\phantom{CH_2=}R$$

in which

R represents a hydrogen atom or a —$CH_3$ group and R' represents a straight or branched chain alkyl radical containing 1 to 18 carbon atoms, or mixtures thereof, wherein at least 50% by weight of said esters are those in which R' is an alkyl radical containing 1 to 4 carbon atoms, (Ib) 0.1 to 20 parts by weight of an organic acid ester of the formula $$CH_2=C-COOR^2 \quad \quad (Ib')$$
$$\phantom{CH_2=}|$$
$$\phantom{CH_2=}R$$

in which

R represents a hydrogen atom or a —$CH_3$ group and $R^2$ represents $$-(CH_2)_n-OH \text{ or } -(CH_2)_m-O-(CH_2)_m-OH,$$

in which n is 2, 3 or 4 and m is 2 or 3 of the formula $$R^3OOC-CH=CH-COOR^2 \quad \quad (Ib'')$$

in which $R^3$ represents a hydrogen atom or an alkyl radical containing 1 to 12 carbon atoms, and $R^2$ is as defined above, or mixtures of organic acid esters of formulas (Ib') and (Ib''), (Ic) 0 to 10 parts by weight of other monomers capable of copolymerising with components of formula (Ia), the sum of the components (Ia), (Ib) and (Ic) amounting to 100 parts by weight, in the presence of (II) 5 to 40 parts by weight of a terminal-blocked alkyl-hydrogen polysiloxane which has a viscosity in the range from 20 to 1000 cP at 20° C., and in which the alkyl radicals contain 1 to 4 carbon atoms, and the ratio between the silicon-bonded alkyl radicals and the silicon-bonded hydrogen atoms is in the range from 13:1 to 1:1, in which ratios the terminal groups are not included.

* * * * *